(12) United States Patent
Wang

(10) Patent No.: US 12,482,338 B2
(45) Date of Patent: Nov. 25, 2025

(54) SMART ALARM MODULE WITH TILT SENSOR FOR AUTOMOBILE SECURITY SYSTEM

(71) Applicant: PROMASTER SECURITY LTD., New Taipei (TW)

(72) Inventor: Reng-Shan Wang, New Taipei (TW)

(73) Assignee: Reng-Shan Wang, Taipei (TW)

( * ) Notice: Subject to any disclaimer, the term of this patent is extended or adjusted under 35 U.S.C. 154(b) by 101 days.

(21) Appl. No.: 18/608,924

(22) Filed: Mar. 18, 2024

(65) Prior Publication Data
US 2025/0292666 A1  Sep. 18, 2025

(51) Int. Cl.
*G08B 13/16* (2006.01)
*G08B 3/10* (2006.01)

(52) U.S. Cl.
CPC ........... *G08B 13/1645* (2013.01); *G08B 3/10* (2013.01)

(58) Field of Classification Search
CPC ............................ G08B 13/1645; G08B 3/10
See application file for complete search history.

(56) References Cited

U.S. PATENT DOCUMENTS

| | | | |
|---|---|---|---|
| 11,059,454 B1* | 7/2021 | Wang | B60R 25/04 |
| 2006/0082448 A1* | 4/2006 | Maeda | B60R 25/1004 340/428 |
| 2007/0090930 A1* | 4/2007 | Kato | B60R 25/1004 340/429 |
| 2007/0103278 A1* | 5/2007 | Kawata | B60R 25/1004 340/429 |

* cited by examiner

*Primary Examiner* — Davetta W Goins
*Assistant Examiner* — Sharmin Akhter
(74) *Attorney, Agent, or Firm* — Chih Feng Yeh; Yongjean Consulting Inc.

(57) ABSTRACT

A smart alarm module equipped for a vehicle includes a microcontroller adapted to arm the smart alarm module in response to a remote controller, a tilt sensor coupled to the microcontroller, where the tilt sensor is applied to the vehicle to sense change of angle values of the vehicle, the tilt sensor is activated to trigger an alarm when the change of angle values exceeds a predetermined value. The tilt sensor includes a register A and a register B to respectively store initial angle values produced from the tilt sensor. A calculation of $|A(n)-B(n+1)|$ is performed to check whether the tilt sensor is triggered, if positive, sends out the alarm; otherwise, stores the updated angle data of the register B in the register A. A(n) represents angle value stored in the register A at previous time, and B(n+1) represents currently updated angle value stored in the register B.

16 Claims, 12 Drawing Sheets

SMART ALARM MODULE WITH TILT SENSOR FOR AUTOMOBILE SECURITY SYSTEM

TECHNICAL FIELD

The present invention relates to security system installed in automobiles, and more particularly, a smart alarm module with tilt sensor for automobile security system.

BACKGROUND

Conventional car security system is typically provided with sensors for monitoring the opened or closed states of a car door, a bonnet and a trunk, and a sensor for detecting vibration of the car. When any of these sensors detects an abnormal condition while the car security function of the system is on (armed), a siren is sound and an engine starter is disabled when an ignition switch is subsequently turned on.

The car security system is typically operated from a remote control unit that transmits wireless communication signals via radio waves, infrared rays, or ultrasonic waves. A user turns off (disarm) the security function of the system while driving the car. When the user gets out of and leaves the car, he/she sends out a signal from the remote unit to the car security system to turn on (arm) the security function.

Traditional security system is usually in the state "always on", in other words, as long as the vehicle battery is connected, and a door was opened, then the shock may trigger a sensor, for example shock sensor, and activate an output (e.g. siren or horn and/or parking light and/or headlight flashing) of the security system.

In the present time, there are many automobile security systems available in the market. A typical automobile security system, its functional diagram as illustrated in FIG. 1, the microcontroller unit 101 receives incoming signal 103 sent from a transmitter 102 (remote unit) through a transceiver 105 and compares or verifies the coded signal with a code stored in a memory 107, which may be EEPROM (not shown) in the microcontroller unit 101. If the code is verified, then a series of output signals are provided to an output terminal of the microcontroller unit 101. These output signals generated from the microcontroller unit 101 are typically a series of control signals or pulses to participate activities such as locking the doors and arming the system. For example, arming the system causes a flash of the automobile parking lights, a single chirp from the siren, and causing the flashing of the interior LED status indicator to activate. Additionally, arming the system causes the starter to be cut and if the interior dome light is on, to turn it off, as would be readily understood by those skilled in the art. A voltage regulator 20 powers the automobile security system.

The memory 107 functions as an internal memory for the microcontroller unit 101 or as an auxiliary memory for other incorporated components. As illustrated, the input interface 109 is connected to various vehicle inputs including valet switch 111, program switch 113, and override switch 115.

In addition, a typical security system includes inputs or sensors (e.g. to sense if a door is open or close), and outputs (e.g. to a siren or lighting devices). The security system is either usually always on, and the automobile battery is connected to the microcontroller unit. The security system is either armed (i.e. ready to sense an input sensor and activate an output in response thereto), or disarmed (i.e. not to be activated by a sensor). When the system is armed, and the sensor is activated, then a sensor designed to sense this situation is triggered, and the security system will send an output-to-alarm signal (e.g. siren) to make the SIREN or HORN honk.

As shown in FIG. 1, the override switch 115 provides an input to the microcontroller unit 101. The switch is typically a depress switch located within the car and placed at a position known only to the driver, which would send a signal pulse to the microcontroller unit 101. This is usual for the location of the override switch, as is the location for a valet switch 111. The trigger and sensor circuitry 117 performs the security of the automobile. When the trigger and sensor circuitry 117 detects touching, it generates a signal and feeds it directed to the microcontroller unit 101.

As illustrated, the output interface 119 of the microcontroller unit 101 can be connected to a variety of output devices. The outputs may include and not limited to auxiliary relays such as window control 121 or remote start 135, as would be readily understood by those skilled in the art. Other outputs include a door lock 131, starter cutoff 135, disarm/arm outputs 125/127, dome light 129, parking lamp 141, siren 123, and valet/dashboard LED indicator 133.

Currently, vehicle security systems are widely used to deter vehicle theft, prevent theft of valuables from a vehicle, deter vandalism, and to protect owners and occupants, which are limited to theft activities of a vehicle due to invasion, a window breakthrough, and/or other similar activities due to external impacts acted on the vehicle body. However, vehicle security systems currently available on the market have very limited solution to deal with the up-rising theft activities of stealing valuable exterior portions/parts of vehicle, such as tire and catalytic converter theft activities.

SUMMARY OF THE INVENTION

To solve issues aforementioned, in one aspect the present invention provides a smart alarm module equipped for a vehicle, which includes a microcontroller adapted to arm the smart alarm module in response to a remote controller, a tilt sensor coupled to the microcontroller, where the tilt sensor is applied to the vehicle to sense change of angle values of the vehicle, the tilt sensor is activated to trigger an alarm when the change of angle values exceeds a predetermined value. The tilt sensor includes a register A and a register B to respectively store initial angle values produced from the tilt sensor. A calculation of $|A(n)-B(n+1)|$ is performed to check whether the tilt sensor is triggered, if positive, sends out the alarm; otherwise, stores the updated angle data of the register B in the register A. $A(n)$ represents angle value stored in the register A at previous time, and $B(n+1)$ represents currently updated angle value stored in the register B.

In one preferred embodiment, the smart alarm module further comprises a shock sensor, an ultrasonic sensor, a microwave sensor or the combination thereof. The smart alarm module is activated to send out the alarm when one of the shock sensor, the ultrasonic sensor, the microwave sensor or the tilt sensor is triggered. The smart alarm module further comprises updating the angle value stored in the register B at a constant time period. The tilt sensor is triggered if $|A(n)-B(n+1)|$ is greater than the predetermine value.

In one preferred embodiment, the shock sensor includes a piezo shock sensor, a magnetic shock sensor or the combinations thereof. The alarm is output by a car horn, a siren, a buzzer, or the combinations thereof.

In one preferred embodiment, the smart alarm module further comprises an arm mode and a disarm mode respectively settable in response to a lock button or an unlock button of the remote controller. The microprocessor is adapted to arm or disarm the smart sensor module in response to the lock button. An exterior lighting device is responsive to the arm or disarm.

In another aspect, the present invention provides a smart alarm module equipped for a vehicle, which includes a CAN bus interface adapted to make connection to CAN bus of the vehicle to detect communication protocol and receive information from a remote controller, a microcontroller adapted to arm the smart alarm module in response to a remote controller, a tilt sensor coupled to the microcontroller, where the tilt sensor is applied to the vehicle to sense change of angle values of the vehicle. The tilt sensor is activated to trigger an alarm when the quantized values or the change of angle values exceeds a predetermined value. The tilt sensor includes a register A and a register B to respectively store initial angle values produced from the tilt sensor. A calculation of $|A(n)-B(n+1)|$ is performed to check whether the tilt sensor is triggered, if positive, sends out the alarm; otherwise, stores the updated angle data of the register B in the register A. $A(n)$ represents angle value stored in the register A at previous time, and $B(n+1)$ represents currently updated angle value stored in the register B.

In one preferred embodiment, the smart alarm module further comprises a shock sensor, an ultrasonic sensor, a microwave sensor or the combination thereof. The smart alarm module is activated to send out the alarm when one of the shock sensor, the ultrasonic sensor, the microwave sensor or the tilt sensor is triggered.

In one preferred embodiment, the smart alarm module further comprises updating the angle value stored in the register B at a constant time period. The tilt sensor is triggered if $|A(n)-B(n+1)|$ is greater than the predetermine value. The shock sensor includes a piezo shock sensor, a magnetic shock sensor or the combination thereof. The alarm is output by a car horn, a siren, a buzzer, or the combinations thereof.

In one preferred embodiment, the smart alarm module further comprises an arm mode and a disarm mode respectively settable in response to a lock button or an unlock button of the remote controller. The microprocessor is adapted to arm or disarm the smart sensor module in response to the lock button. An exterior lighting device is responsive to the arm or disarm.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention proposed a smart sensor (smart alarm module) for automobile security system, which is integrates with automobile's original remote central lock system.

Figure 1:
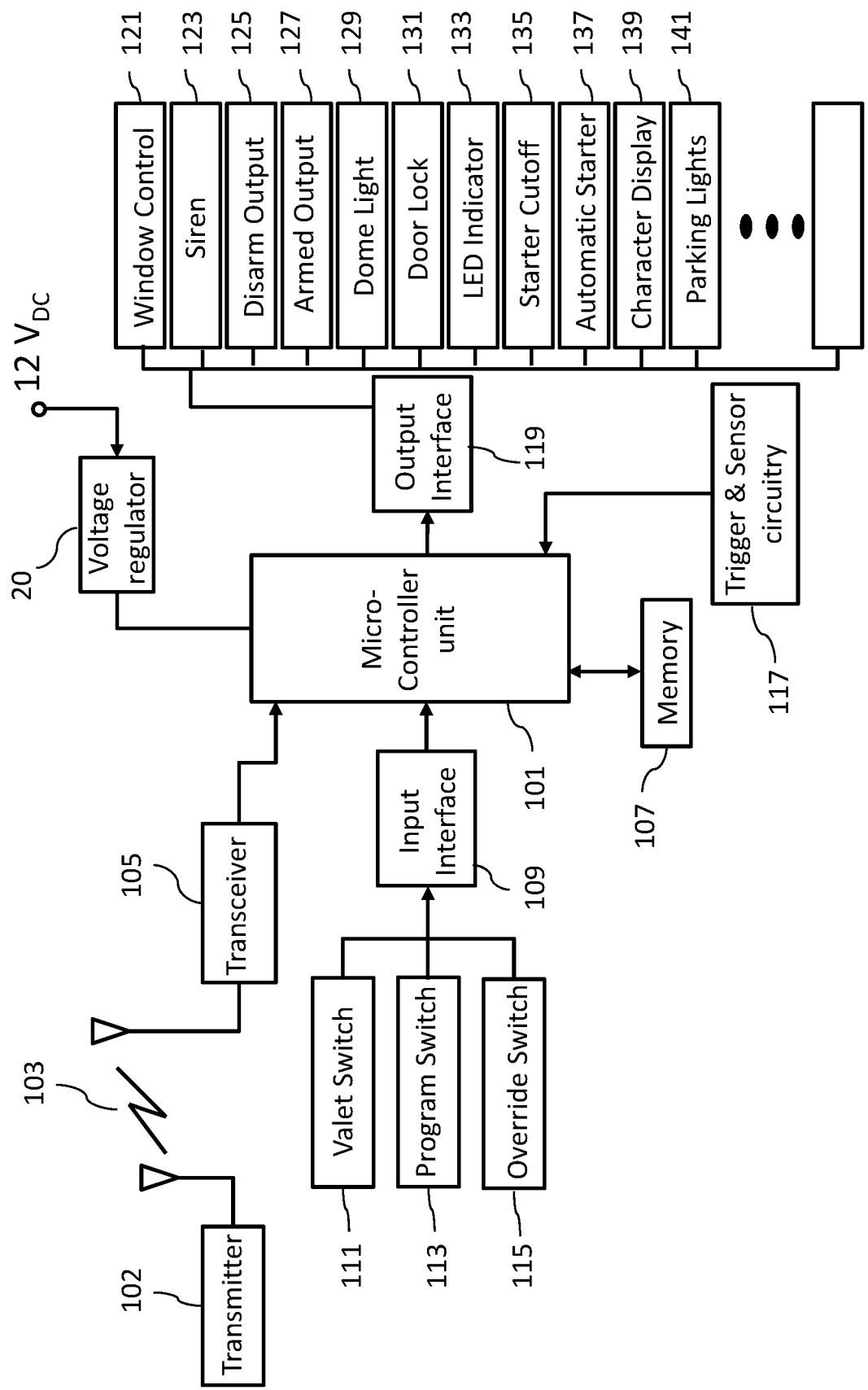
FIG. 1 illustrates a block diagram showing the automobile security system according to a prior art.
Figure 2:
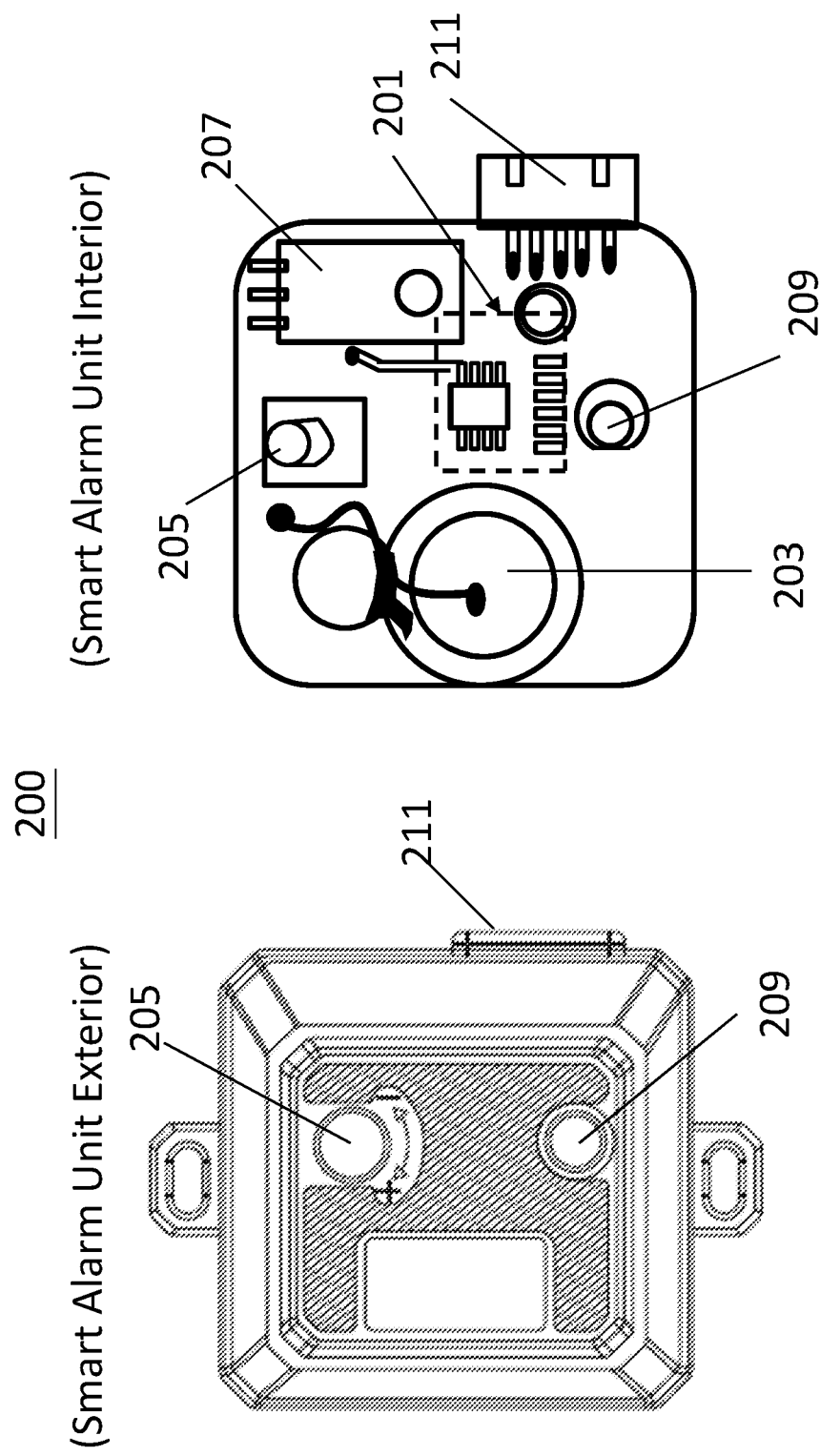
FIG. 2 illustrates exterior and interior of the proposed smart alarm module according to a preferred embodiment of the present invention.

Please refers to FIG. 2, figure on the left (right) shows exterior (interior) of the proposed smart alarm module. The proposed smart alarm module 201 that is included (or integrated with) a tilt sensor (not shown) includes an input interface 202 connected to a core sensing component 203, a sensitivity adjustment nub 205, an ACC input port, a parking light input port, and a five wires connector 211, and an output interface containing a Siren/Car Horn output port 207 and a push button/LED 209. The input interface 201 can control arm/disarm, alarm functions of the device, and learn the number of times of the parking light flashes of the device. The core sensing component 203 can include internal sensor such as a magnetic shock sensor and tilt sensor, and external sensor such as a piezo shock sensor, an ultrasonic sensor, or a microwave sensor. The output interface includes a siren/horn output port, LED light indication, etc. Where the five wires connector includes +12 V port, ground (GND) port, a CAN BUS (+) port, the CAN BUS (−) port, and a Siren/Car Horn output port.

The smart alarm module (smart sensor) is designed to install in a vehicle and integrate with vehicle's remote central door locking system. Nowadays in the auto market, all cars sold will be equipped with a remote control having central lock function provided by their original car manufacture. When the owner uses the original car's remote control to lock the remote controlled doors, the vehicle flashes its paring light one time to indicate that the vehicle's doors have been locked. When the owner uses the remote control to unlock the remote controlled doors, the vehicle flashes its paring light two times to indicate that the vehicle's doors have been unlocked.

The present invention captures some fundamental features of security system accompanied with widely-used common operational visual characteristic of vehicle's locking/unlocking action. In addition, the present invention introduces extended capability of integrating a smart alarm module to vehicle's CAN bus interface to obtain the vehicle's original remote control locking/unlocking, door open, ACC on, and other information, to provide operation arm/disarm, trigger and other modes.

Figure 3A:
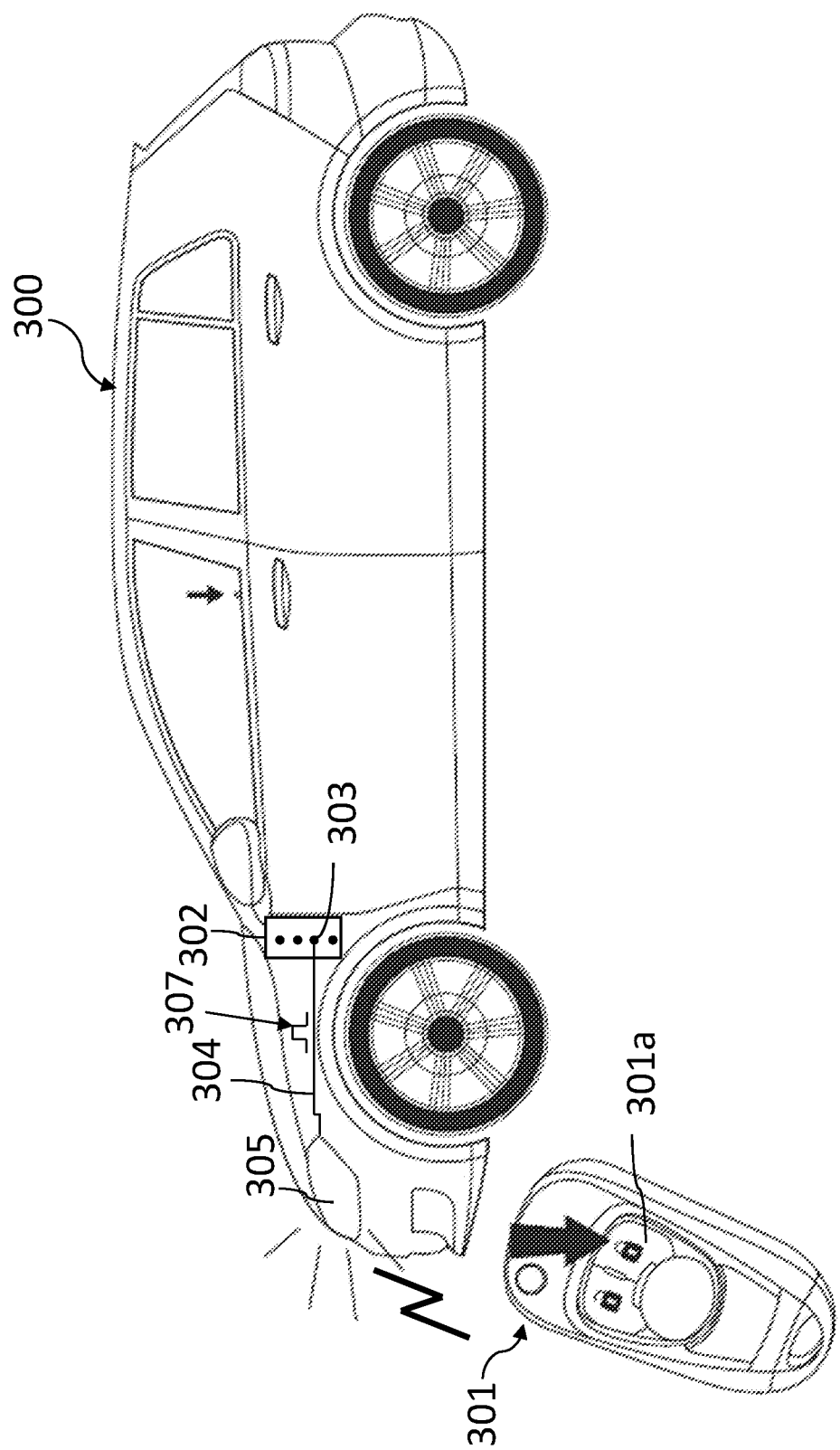
FIG. 3A illustrates the reaction of a vehicle equipped with central locking system but not yet installed any alarm system, when the LOCK button on the remote controller from the original manufacturer was pressed-down.
Figure 3B:
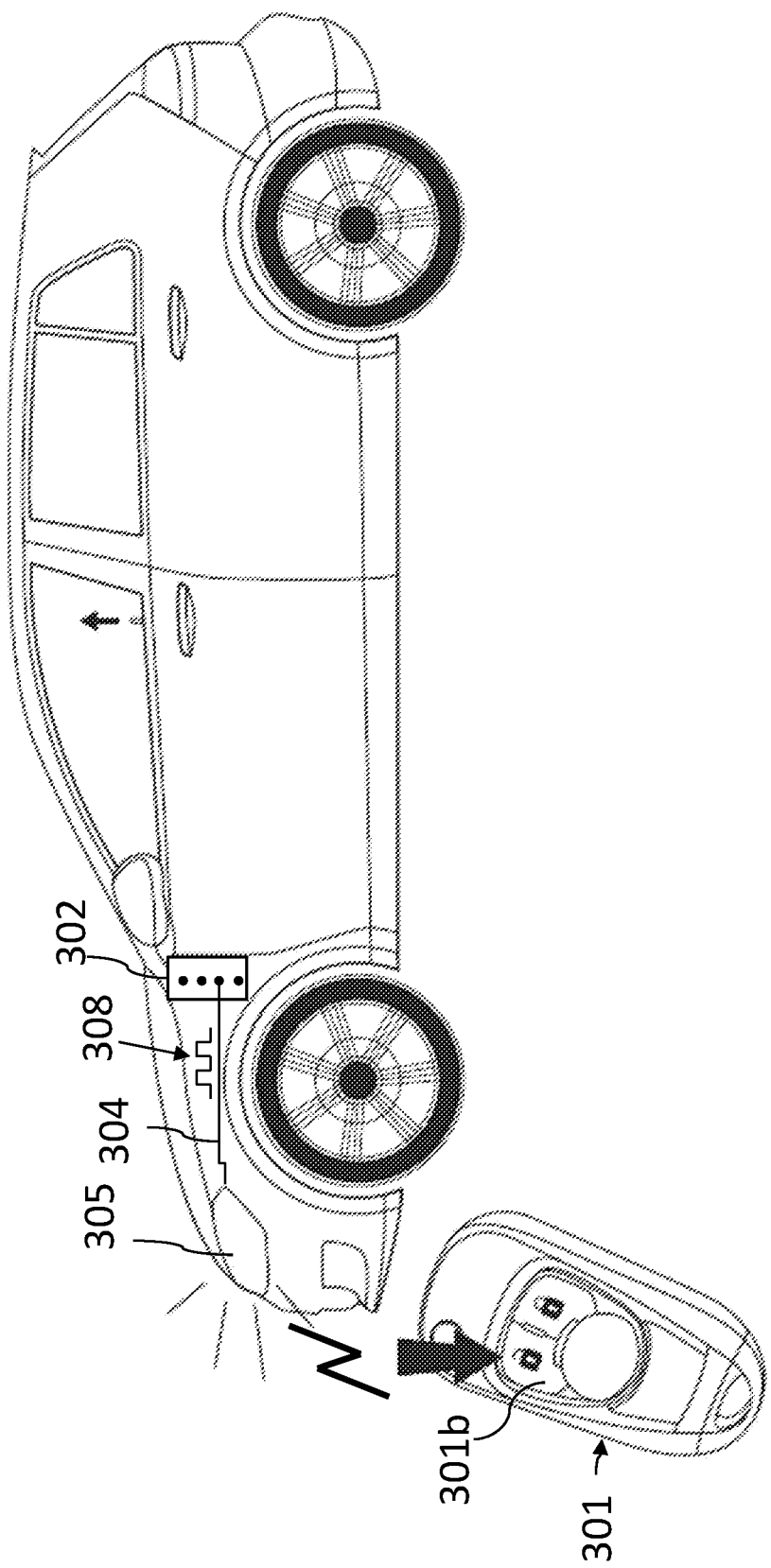
FIG. 3B shows the reaction of a vehicle equipped with central locking system but not yet installed any alarm system, when the UNLOCK button on the remote controller paired to the vehicle from the original manufacturer was pressed.

A vehicle 300 equipped with a central lock system always comes with a remote controller 301 paired to the vehicle 300 by its manufacture, prior to the installation of any vehicle security system. How the vehicle 300 reacts with the operation of the remote controller (LOCK/UNLOCK) 301 are illustrated in FIG. 3A and FIG. 3B, respectively. FIG. 3A illustrates when the driver leaves the vehicle 300, closes the door, and then presses the LOCK button 301a on the vehicle's remote controller 301, the vehicle's central locking system will responsively lock the doors. At the same time, the fuse box 302 receives a voltage switching on one of the fuse 303 electrically coupled to the positive terminal of parking light 305. Because there is a voltage switching, i.e. voltage pulse 307, applied to the parking light 305, it flashes once in response to the driver's action of pressing the LOCK button 301a on the remote controller 301. It is obvious that when the LOCK button 301a is pressed, there will be a voltage switching transmitted through the connecting wire 304 to the parking light 305 and make it flash once, this may be referred as a flash pattern of the parking light 305. In addition, the number of flashes of the paring light is equal to the number of the voltage level switching times on the connecting wires coupled to the parking light 305. In FIG. 3B, the UNLOCK button 301b of the vehicle's remote controller 301 is pressed, the other voltage pulse 308, which is generated by the central locking system, was transmitted to the parking light 305 and make it flash twice. This flash pattern of parking light (flashing twice) 305 is used as an indication that the car's door has been unlocked. At this moment, the voltage on the connecting wire 304 electrically coupled to the parking light 305 varies in response to the driver's action of pressing the UNLOCK button 301b on the remote controller 301.

Figure 4A:
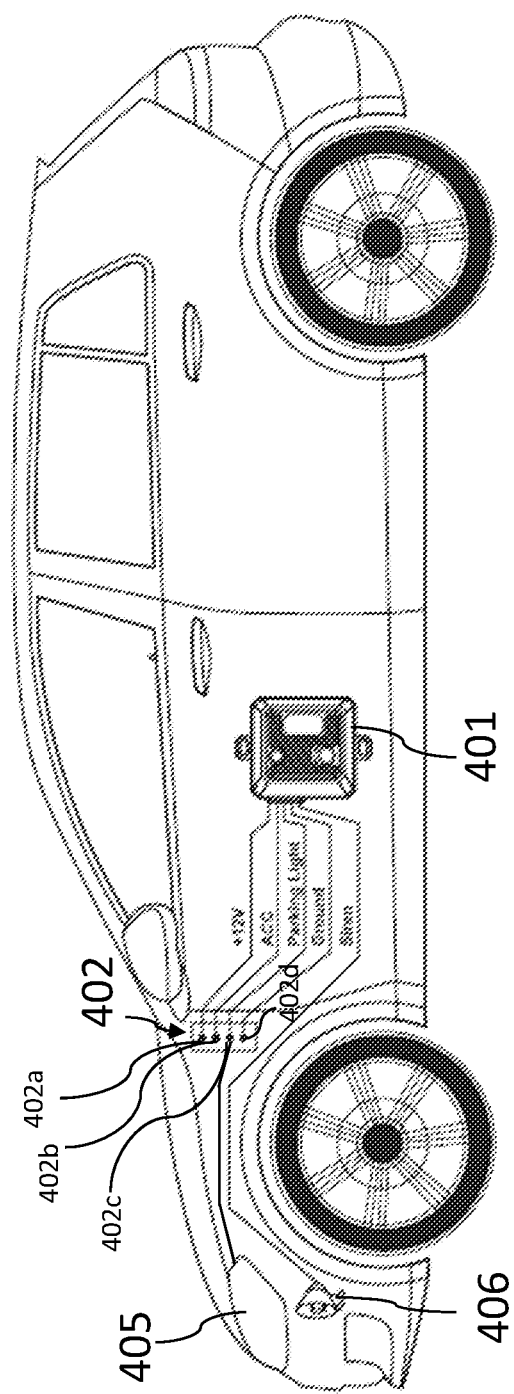
FIG. 4A shows the wiring diagram of the smart alarm system according to one embodiment of the present invention, according to which, the smart sensor module is connected to the siren, the fuse box and headlight of the vehicle.

FIG. 4A depicts how to wire the smart alarm module 401 that is integrated with a tilt sensor to a vehicle's central lock system according to one embodiment of the present invention. The installation includes connecting four conducting wires of the smart alarm module 401 to four fuses (402a, 402b, 402c, and 402d) of the fuse box 402, which can be found in each vehicle, wherein one of the four connecting wires is connected to the fuse 402c, and then connects to the paring light 405, the fifth connecting (Siren) wire is connected to an audio device, such as a siren 406.

Figure 4B:
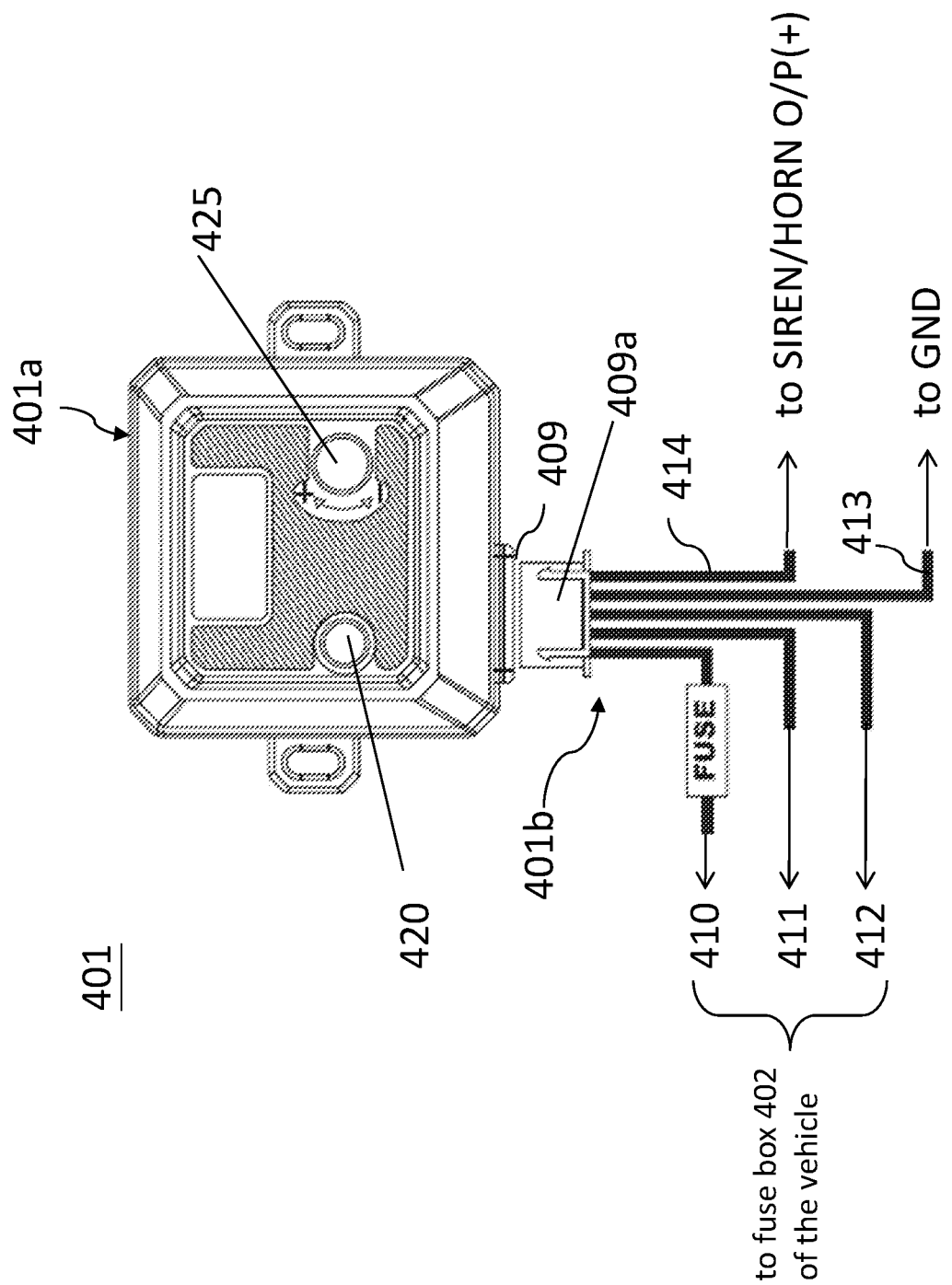
FIG. 4B shows the physical appearance of the smart sensor module and the wiring set according to one aspect of the embodiment of the present invention.
Figure 4C:
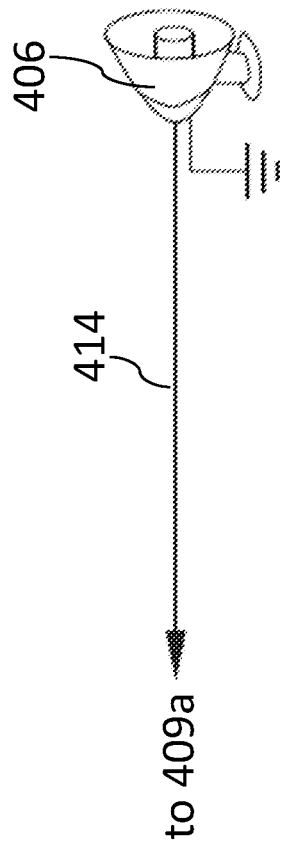
FIG. 4C shows a part of the smart alarm system, in which, a siren is utilized and connected to the other part of the smart alarm system according to one aspect of the embodiment of the present invention.
Figure 4D:
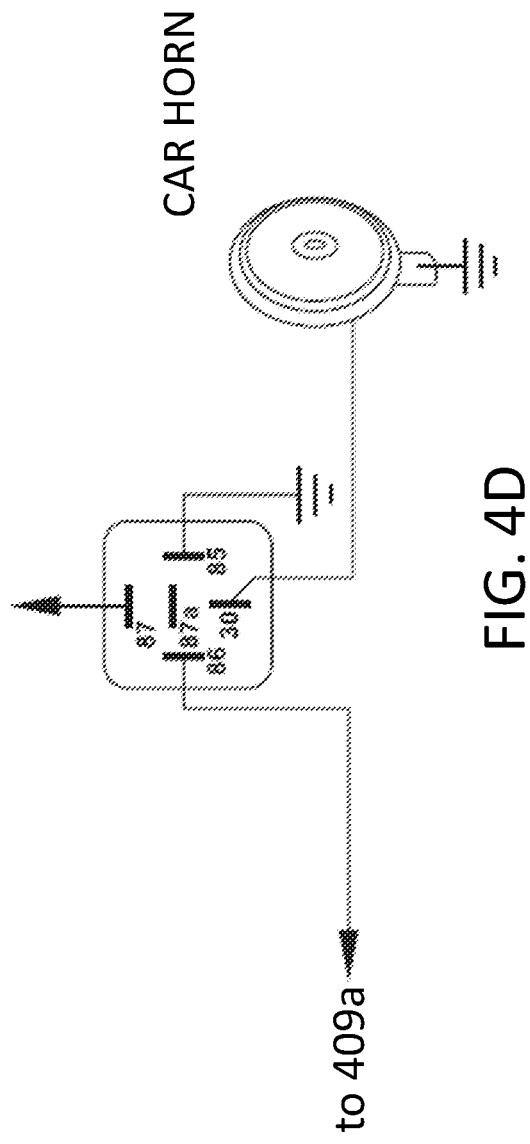
FIG. 4D shows a part of the smart alarm system, in which, a car horn is utilized and connected to the other part of the smart alarm system according to the other aspect of the embodiment of the present invention.

In FIG. 4B, the smart alarm module 401 includes a smart sensor module 401a that is integrated with a tilt sensor and a connector wire set 401b, the connector wire set 401b is designed to electrically coupled to the connector terminal 409 of the smart sensor module 401a. The connector wire set 401b includes a wire 410 connected to a fuse and also connected to fuse box 402 of the vehicle (+12V), a wire 411 electrically coupled to parking light 405, a wire 412 electrically coupled to an accessory input, a wire 413 adopted in the connector wire set 409a is electrically grounded (GND), and a wire 414 electrically coupled to one or both of the following device: a siren or a horn (SIREN/HORN O/P(+)). FIG. 4C shows one aspect of the preferred embodiment of the present invention. The siren is connected to the wire 414 for receiving output signal from the smart sensor module 401a (see FIG. 4B). FIG. 4D shows the other aspect of the preferred embodiment of the present invention. The CAR horn is connected to the wire 414 for receiving output signal from the smart sensor module 401a (see FIG. 4B).

A switch 420 of the smart sensor module 401a depicted in FIG. 4B is used to start/end the smart sensor module 401a, in one preferred embodiment the switch is a lightable switch, which is a push switch over a light emitted diode (LED), to enable the light from the LED being visible to people. In other embodiment, the switch 420 may utilize other kind of switches that doesn't emit light. An adjustable core sensing component 425, which can be an adjustable piezo shock sensor/magnetic shock sensor/ultrasonic sensor/microwave sensor, is used to adjust a threshold value of the adjustable core sensing component 425 to a suitable level. If anything makes the vehicle shock or vibrate or shake, i.e. any impact applied to the vehicle, to a certain extend exceeds a preset/predetermined value, the smart sensor module 401a will subsequently send a signal through wire 414 to make the audio device such as siren and/or horn honk for a period of time.

Automobiles today are monitored and controlled by many electronic control units (ECUs) that communicate with each other by an automotive bus standard, controller area network (CAN), for connecting multiple ECUs and provides real-time, high-speed communication between ECUs. A CAN bus is a robust vehicle bus standard designed to allow microprocessors and devices to communicate with each other's applications without a host computer. It is a message-based protocol, designed originally for multiplex electrical wiring within automobiles to save on copper, but can also be used in many other contexts. For each device the data in a frame is transmitted sequentially but in such a way that if more than one device transmits at the same time the highest priority device is able to continue while the others back off. Frames are received by all devices, including by the transmitting device.

Figure 5:
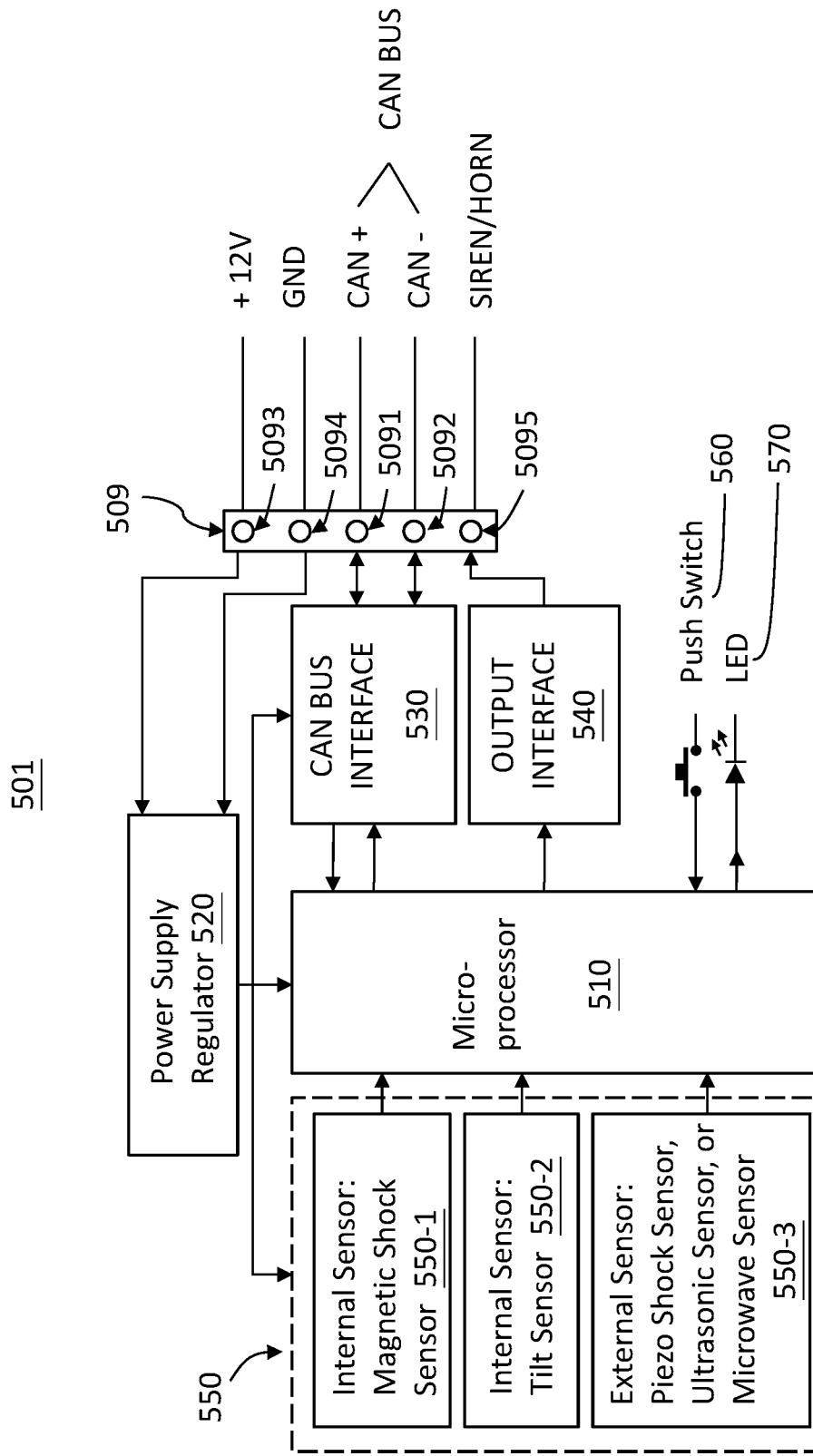
FIG. 5 shows the block diagram of a smart alarm module having a CAN bus interface according to a preferred embodiment of the present invention.

Please refer to FIG. 5, it shows the block diagram of a smart alarm module 501 included (or integrated with) a tilt sensor 550-2 and having a CAN bus interface 530, which supports connection to CAN bus of the vehicle, according to one preferred embodiment of the present invention. In the smart sensor module 501, a microprocessor 510 operationally connected to a power supply regulator 520, a sensor assembly 550, a push switch 560, a LED 570, and a controller area network (CAN) bus interface 530, and an output interface 540; a connector terminal 509 makes electrical connections to the power regulator 520, the CAN bus interface 530, the output interface 540 for accepting a connector wire set to be plugged into. Each wire adopted in the connector wire set will be electrically coupled to one corresponding pole adopted in the connector terminal 509. In one of the preferred embodiments, the sensor assembly 550 can includes internal sensors such as a magnetic shock sensor 550-1, a tilt sensor 550-2, and external sensor 550-3 such as piezo shock sensor, ultrasonic sensor or microwave sensor. In one of the preferred embodiments, the sensor assembly 550 can use a piezo shock sensor, a magnetic shock sensor, an ultrasonic sensor, or a microwave sensor for sensing object movement, impact, vibration, etc. In one of the preferred embodiments, the sensor assembly 550 can use a tilt sensor to sensing tilted angle of the vehicle. The sensor assembly 550 is adjustable and user can adjust its sensitivity to make it responses properly. The push switch 560 is used to start/end programming the smart alarm module 501, and the on/off status of the LED 570 is used to show the alarm mode of the smart alarm module 501, namely, to show whether the smart alarm module 501 is in arm mode, disarm mode, or triggered entering system programming status. If the LED 570 flashes once for every consecutive second, it represents that the smart alarm module 501 is in ARM MODE. If the LED 570 isn't lightened, it represents that the smart alarm module 501 is in DISARM MODE. If the LED 570 flashes rapidly, it represents that the smart alarm module 501 is being triggered entering system programming, which can be utilized to store the LOCK number and the UNLOCK number into the cue of the microprocessor 510, the rapidly flashing LED 570 indicates the smart alarm module 501 being in this state. Thereafter, the criteria for determining LOCK/UNLOCK is changed to the newly stored LOCK/UNLOCK number, which is referred in this application as LOCK/UNLOCK value.

The power regulator 520 regulates the power from wire coupled to +12 volts to an operation voltage for the microprocessor 510, the CAN bus interface 530, the output interface 540, and the sensor assembly 550 to let them work with operation voltage. If a signal from the ACC I/P(+), or from PARKING LIGHT I/P(+), which was electrically coupled to CAN bus, was sent through CAN bus interface 530 to microprocessor 510, or if a signal from sensor assembly 550, for example a shock sensor, was sent to the microprocessor 510, subsequently, the microprocessor 510 responsively send a signal to the output interface 540, and then the output interface 540 regulated the signal to the operation voltage to sound the SIREN/HORN to attract the attention from the people nearby the vehicle. The CAN bus interface includes a CAN protocol detection unit to detect communication protocol from ECUs of the vehicle, for example from the remote controller to obtain the original car remote control LOCK, UNLOCK, DOOR OPEN, ACC ON, and other information to provide the smart alarm module judgment operation under ARM, DISARM, TRIGGER and other modes.

As for the five conductive paths, please refer to FIG. 5, the first pole 5091 is coupled to the input terminal of the CAN bus (CAN+), the second pole 5092 is coupled to the input terminal of the CAN bus (CAN−). The third pole 5093 is coupled to the positive end of the battery, such as +12 volt, and the negative end of the battery, which is ground, is electrically coupled to the fourth pole 5094 of the connector terminal 509. In addition, the fifth pole 5095 of the connector terminal is coupled to the positive end of the input terminal of SIREN or HORN of the vehicle.

In one preferred embodiment of the present invention, there are at least three occasions, as mentioned in the paragraph immediately prior to this paragraph that the microprocessor 510 will send a signal through the output interface 540 to sound the SIREN/HORN of the vehicle. The three occasions mentioned above include the following scenarios when the smart sensor being in the ARM status. The first scenario is when the smart alarm module being in the ARM status and an impact occurred to the vehicle, such as a door or the trunk of the vehicle was opened, and the shock exceeds a preset value stored in the magnetic shock sensor 550-1 (or piezo shock sensor 550-3), then a first activating signal is substantially fed to the microprocessor 510, and the microprocessor 510 will send an output-to-alarm signal to the output interface 540, and the voltage was regulated to the operation voltage level of the audio device of the vehicle, such as SIREN or HORN, or even buzzer adapted in the vehicle. The second scenario is when the smart alarm module being in the ARM status and the magnetic shock sensor 550-1 detected that there is shockwave that is associated with a window or a door being broken. The shock sensor quantizes the shock wave resulted from the impact occurred to the vehicle. When a shock wave larger than the adjustable preset value is detected, then an first activating signal is substantially fed to the microprocessor 510 from the shock sensor (such as magnetic shock sensor 550-1 or piezo shock sensor 550-3), and the microprocessor 510 will accordingly send a output-to-alarm signal to the output interface 540, and the voltage was therefore regulated to the operation voltage level of the audio device of the vehicle, such as SIREN or HORN of the vehicle, and make them honk. The third scenario is when the smart alarm module being in the ARM status and the ignition switch is turned through the "ACC" position reaching the START position trying to crank the engine, at this moment, the wire for providing power to electrical accessories, i.e., the wire coupled to the positive end of the accessory, i.e., ACC I/P (+) terminal, is on a high voltage level, for example, 12 volt, then the input interface 530 feed a second activating signal to the microprocessor 510. In responsive to the second activating signal from the input interface 530, the microprocessor 510 send the output-to-alarm signal to the output interface 540, therefore activating the audio device of the vehicle, i.e., sound the SIREN, HORN or buzzer.

It is well known in the art that many vehicles have adopted automatic starter rather than ignition switch, so the user only hit the starter position briefly, this action or a Jump Start trying to crank the engine, there will be a voltage switching on the positive end of ACC input terminal, i.e., ACC I/P (+) terminal. Therefore, if the aforementioned scenario happened in the vehicle equipped with the smart alarm module according to one embodiment of the present invention, because the voltage switched on the positive end of ACC input terminal at the time when the smart alarm module being in the ARM mode, the audio device, SIREN, HONK or buzzer, is subsequently activated by the output interface 540 responsive to the output-to-alarm signal from the microprocessor 510, which is fed with the second activating signal from the input interface 510.

Although the smart alarm module according to the present invention only has five terminals electrically coupled to corresponding elements of the vehicle through five connecting wires, particularly, the smart alarm system according to the present invention is compatible to the original remote controller from the vehicle's manufacturer, therefore, when performing auto security functions, not any additional remote controller is needed, and still, it can perform several basic features that tradition security system possesses. The basic features mentioned above include: once any of the three occasions happened to the vehicle, the SIREN/HORN of the vehicle will chirp for a certain period like 5 seconds or 45 seconds. When the smart alarm module is in alarm mode, and the ignition switch is turned to "ACC" position, then the siren will sound for 45 seconds. On the other hand, the sensor in one aspect of the preferred embodiment of the application to the present invention is configured as a dual zone shock sensor, which has a response mode divided into two stages: 1. Light Trigger: Warning by siren chirp 5 times. 2. Heavy Trigger: Warning by siren chirp 45 times.

According to the disclosure of the present invention, the technician only has to connect five connecting wires from the smart alarm module to corresponding devices of the vehicle, then the smart alarm system utilizing the smart alarm module can possess the three basic features of vehicle alarm system, wherein the functional block of the smart alarm module is disclosed in FIG. 5, and the operation of the smart alarm module is controlled by a program stored in the microprocessor 510. The flowchart of the aforementioned program is disclosed in FIG. 6, which is only utilized to illustrate how the smart alarm system—with only five connecting wires coupled to corresponding devices of the vehicle's—operates to perform the features of a security system in a vehicle.

Figure 6:
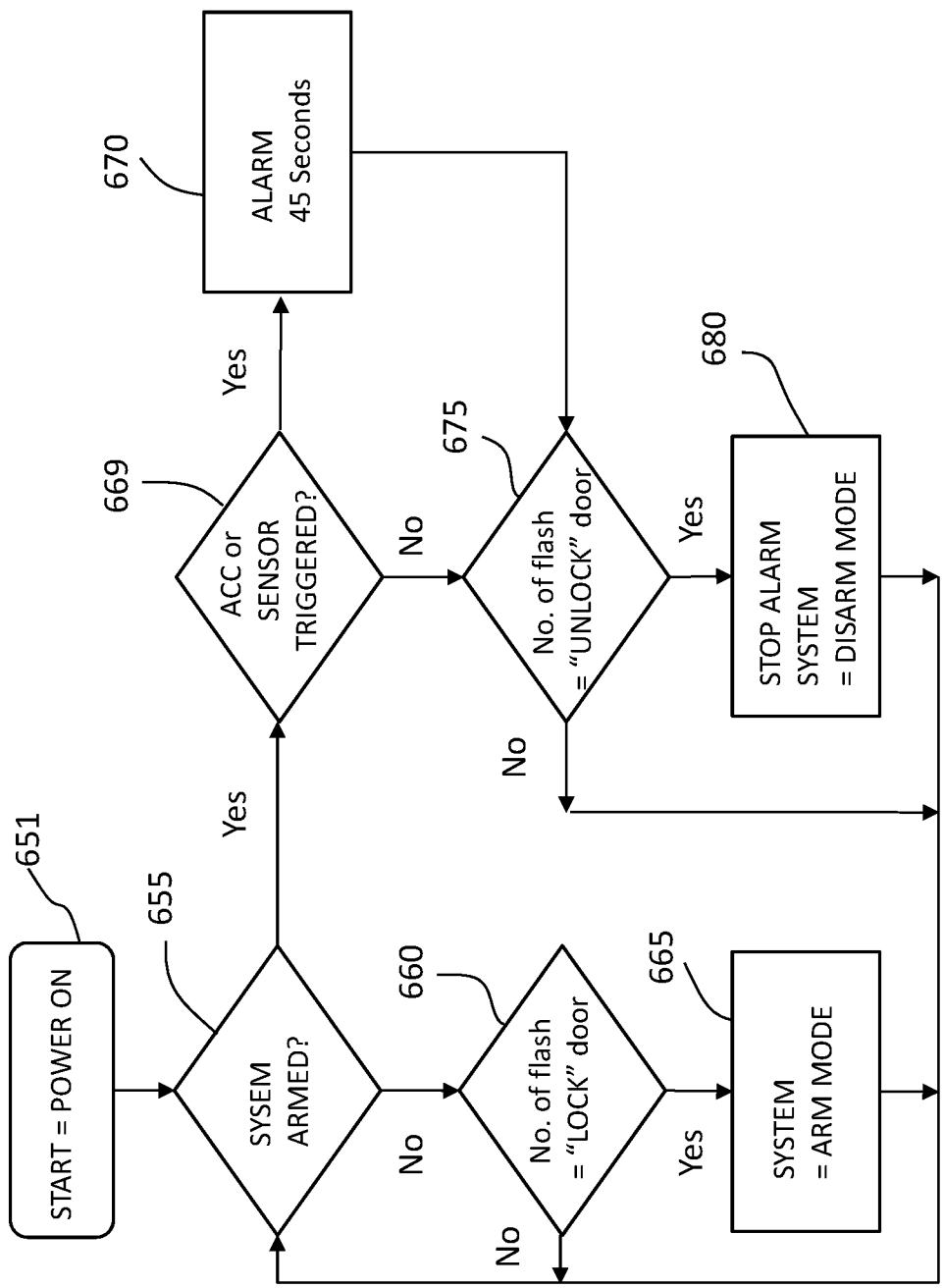
FIG. 6 illustrates the system protection process stored in the microprocessor of the smart sensor module that is used to perform the function as a smart alarm system according to a preferred embodiment of the present invention.

After the smart alarm module according to one preferred embodiment of the present invention coupled to the connecting wires, which was coupled to the fuse box of the vehicle, starts a protection process to perform the function as a vehicle alarm system, and the process is depicted in FIG. 6. The steps shown in FIG. 6 is only one example to demonstrate how certain steps are utilized to complete a couple of actions that perform the features of a smart alarm system according to the present invention. The protection process mentioned-above is stored in the microprocessor 510 (as shown in FIG. 5), and it begins from step 651 "START=POWER ON" to start this procedure, then the next step 655 "SYSTEM ARMED?" is to determine whether the system, i.e., smart alarm module, is armed, if not, then go to step 660 "No. of flash="LOCK" door?", which means determining whether the number of parking light's flash time acquired from CAN bus through the input interface 530 equals to the "LOCK" value stored in the cue of Microprocessor 510, if yes, then go to step 665 "SYSTEM=ARM MODE" to set the status of the smart alarm module as ARMED, then go back to step 655 to determine whether the system is armed.

On the other hand, if the result of step 660 is no, then go back to step 655 "SYSTEM ARMED?" to check whether the smart alarm module, is armed, if not, then go to step 660 again, if yes, go to step 669 "ACC or Shock Sensor Triggered?" to check, through input interface 530, whether the ACC I/P (+) terminal is on a high voltage level, or whether the shock sensor 550 is triggered. If either one of the aforementioned happened, the Microprocessor 510 substantially send a signal through the output interface 540 and the wire coupled to a Horn/SIREN to make the Horn/SIREN 405 chirp, in other words, proceed to step 670 "ALARM 45 seconds", and then go to step 675 "No. of flash="UNLOCK" door?".

If the result of step 669 is no, meaning neither ACC I/P (+) terminal is on a high voltage level, nor the shock sensor 550 is triggered, then the next step after step 669 is step 675 "No. of flash="UNLOCK" door?", which means determining whether the number of parking light's flash time acquired from CAN bus through the input interface 530 equals to the "UNLOCK" value stored in the cue of Microprocessor 530. If the result of step 675 is no, then go back to step 655, determining whether the system is armed or not. On the other hand, if the result of step 675 is yes, then proceed to step 680 "STOP ALARM SYSTEM=DISARM MODE", which means set the smart security module as disarmed mode, in other words, the Microprocessor 510 send a signal through the output interface 540 and the wire coupled to a Horn/SIREN to make the Horn/SIREN 405 silent. Then the next step following step 680 is going back to the step 655, determining whether the system is armed or not.

As described in all previous paragraphs, when the driver lock/unlock the doors of the vehicle, the pattern of the number of times for headlight flashing and/or the number of times for SIREN/HORN chirping is "LOCK": flash/chirp one time, and "UNLCOK": flash/chirp twice, this parking light flash pattern is almost a worldwide standard for the all vehicles in the market. However, especially in the vehicle market of some European areas or other areas like Asia, Africa, Austria or some very limited areas or rare brands, there might be a couple varieties for the pattern of headlight/parking-light flash and/or SIREN/HORN chirps times when the vehicle being undergoing LOCK/UNLOCK the doors of the vehicle. To accommodate these varieties, the present invention provides a mechanism for the user to change the parking light flash pattern and siren-chirp pattern for automatically setting the smart security module as ARM/DISARM MODE.

The mechanism mentioned above is a system programming procedure, it is obvious that there can be many procedures utilize many other processes to accomplish the same goal as described in this disclosure, the following is only an example to illustrate one aspect of the embodiment of the application to the present invention. When the user want to change the pattern of headlight-flash and siren-chirp times for automatically setting the smart security module as ARM/DISARM MODE, the user can utilize the smart security module to proceed with a system programming procedure. To enter system programming, the user, at first, turn the ignition key, namely, ignition switch, to ACC position. Secondly, the user presses the Push Switch seven times in ten seconds, subsequently, the user turns the ignition key from ACC position to OFF position. After the entry of system programming, the light emitted diode (in FIG. 5, it is referred as number 570) will continuously blink, then the user can start to press the push switch as many times as the headlight blinks when the vehicle undergoing LOCK/UNLOCK action. Finally, these values will be stored into the cue of the microprocessor as the values utilized to determine whether the user press the LOCK or the UNLOCK button.

For example, if the setting of the vehicle from original manufacturer is that the blink pattern of the driver's vehicle is headlight flashes 10 times after the user press-down the LOCK button on the remote controller, and blinks 2 times after the user press-down the UNLOCK button on the remote controller, according to the embodiment of the present disclosure, the user of the smart alarm module should press the push switch 10 times to input a new number of headlight flash times, it is 10 in this example, and this value will be stored in the microprocessor 510 (FIG. 5) as lock number. Next time, if the driver presses LOCK button, then the input interface 530 receives a signal composed of 10 pulses from the CAN bus, in other words, the signal switched between voltage high and voltage low ten times. Accordingly, the microprocessor 510 compares the number from the input interface 530 with the default ARM number, in other words, LOCK value, stored in the cue of microprocessor 510, and find that it is a match, as a result, the microprocessor 510 sets the smart alarm module as ARM MODE. With the same manner, the user can subsequently utilize the number of headlight blink times, in this example, it is 2, to store into the cue of microprocessor 510 as the DISARM number, in other words, UNLOCK value, to determine when to set the smart alarm module as DISARM MODE.

From the previous paragraph, it is clear that the smart alarm module according to the present invention can be installed to the any kind of vehicles, even if, when undergoing ARM/DISARM action, the number of headlight blink times are different from that originally stored in the microprocessor of the smart alarm module in the present invention. The only learning procedure to program the setting of LOCK/UNLOCK value, the user only has to follow the steps as described in the previous paragraph. In other words, no matter what headlight flash pattern does a vehicle have, the smart alarm module according to the present invention has provided an operational process for the user to enter system programming, thus enabling the user to replace the originally default flash pattern number (LOCK/UNLOCK values) stored in the cue of the microprocessor with the practical flash pattern number comes with the setting from the vehicle's manufacturer, and making the smart alarm module automatically and correctly ARM/DISARM the smart alarm system when one button of the vehicle's remote controller being pressed-down to LOCK/UNLOCK the vehicle.

As described in the last paragraph prior to the present paragraph, the user can perform system programming by entering system programming process, which, in the first step turning ignition key to ACC, the second step pressing push button 7 times within 10 seconds, then turning from ACC to OFF. After the user's entry of system programming, the subsequent step is to learn ARM MODE, namely, input the headlight flash ARM number to the microprocessor. In order to reach this goal, after the entry of system programming, the user has to turn the ignition key the first time from OFF position to ON position, then the Siren will chirp once, and then, the user presses the push button 10 times, take the ARM number in the fourth paragraph prior to the present paragraph as an example. At this time the headlight of the vehicle will flash once, and the siren chirp once. Then the user turns the ignition key from position ON back to position OFF to finish this step. The following step is the second step, which is the second time the user turning the ignition key from position OFF to position ON, and this action will result in the siren chirp twice, and this is the step the user input the headlight flash DISARM number to the microprocessor. In order to reach this goal, after the first step setting headlight flash ARM number, the user has to proceed the second step, turning the ignition key the second time from OFF position to ON position, then the Siren will chirp twice, and then, the user presses the push button 2 times, take the DISARM number in the fourth paragraph prior to the present paragraph as an example. At this time the headlight of the vehicle will flash twice, and the siren will chirp twice. Then the user turns the ignition key from position ON back to position OFF to finish this step. The steps to headlight flash ARM number and DISARM number mentioned above is to show the alarm programmable features according to one aspect of one embodiment of the present invention, which is only an example, and is illustrated in Table 1 for reference.

TABLE 1

| No. | Function | Ignition OFF to ON 1$^{st}$ time Siren chirp once | Ignition OFF to ON 2nd time Siren chirp twice | |
|---|---|---|---|---|
| 1. | Learning mode | Learning ARM Mode (DF = 1 flash) | Learning DISARM Mode (DF = 2 flashs) | Siren chirp once |
| 2. | Siren/ Horn | Horn | Siren (DF) | Siren chirp once |

After testing Sedan, VAN, SUV, PICKUP and other vehicle types, it is found that the theft has to jack up the vehicle body at least with an angle over 1 degree to steal the tires, catalytic converter or other valuable exterior portions/parts of the vehicle.

Figure 7A:
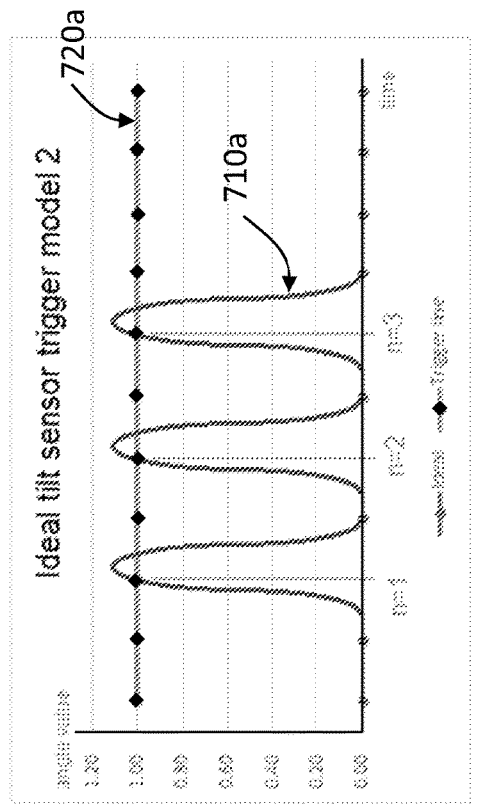
FIG. 7A illustrates a schematic single-point trigger mode for triggering a tilt sensor that is included in or integrated with the smart alarm module according to a preferred embodiment of the present invention.
Figure 7B:
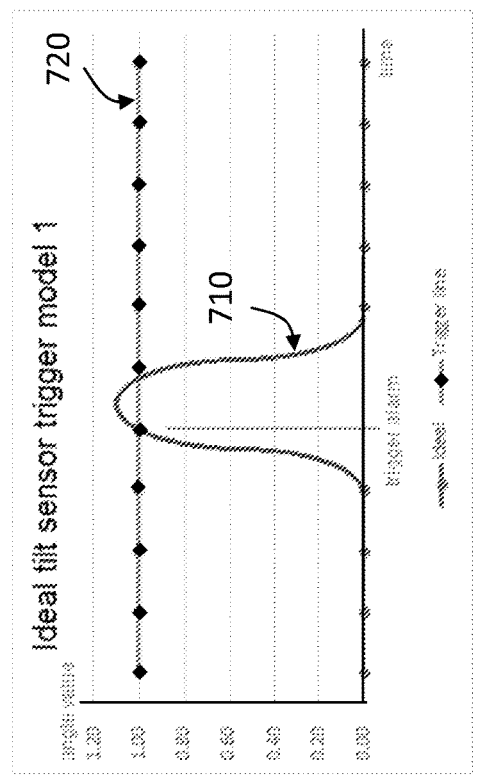
FIG. 7B illustrates a schematic multiple-point trigger mode for triggering a tilt sensor that is included in (or integrated with) the smart alarm module according to a preferred embodiment of the present invention.
Figure 7C:
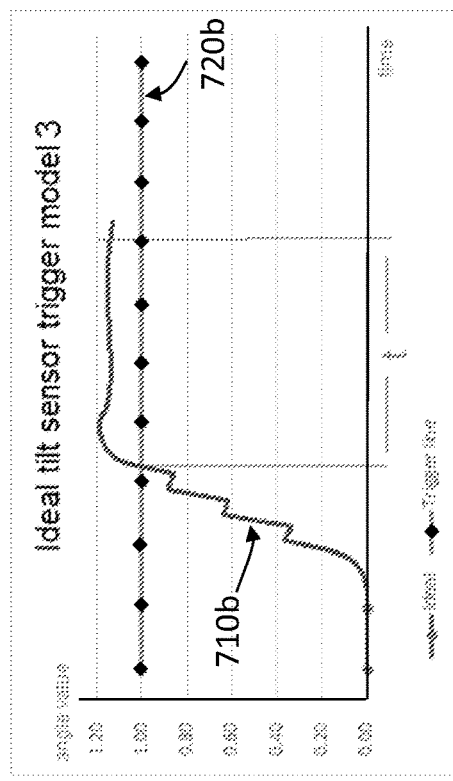
FIG. 7C illustrates a schematic continuous trigger mode for triggering a tilt sensor that is included in (or integrated with) the smart alarm module according to a preferred embodiment of the present invention.

To deter these up-rising theft activities, the present invention proposed to have a tilt sensor included in (or integrated with) the smart alarm module 501 (see FIG. 5) used to sense a tilt detection signal produced by the tilt sensor and send out alarm when the vehicle is tilted over a predetermined angle (in degrees) relative to its horizontal. For this purpose, a tilt sensor used to detect changes in the angle values of X, Y, and Z axis should be included in (or integrated with) the smart alarm module to be installed on the vehicle. In ideal situation, there are three types of trigger mode for triggering the alarm of the tilt sensor, as illustrated in FIG. 7A-7C, to determine whether the vehicle has been involved in the stealing of the vehicle. In FIG. 7A, a single-point trigger mode is shown, which depicts that the alarm is activated when the detected angle values (represented as curve 710) of a vehicle is greater than the trigger line (represented as curve 720), which is set as a predetermined value, for example 1 degree. In FIG. 7B, a multiple-point trigger mode is shown, which depicts that the alarm is activated when the detected angle values (represented as curve 710a) of a vehicle is greater than the trigger line (represented as curve 720a), which is set as a predetermined value, for example 1 degree, for n times. In FIG. 7C, a continuous trigger mode is shown, which depicts that the alarm is activated when the detected angle values (represented as curve 710b) of a vehicle is greater than the trigger line (represented as curve 720b), which is set as a predetermined value, for example 1 degree, and lasts for a predetermined period of time.

Figure 8A:
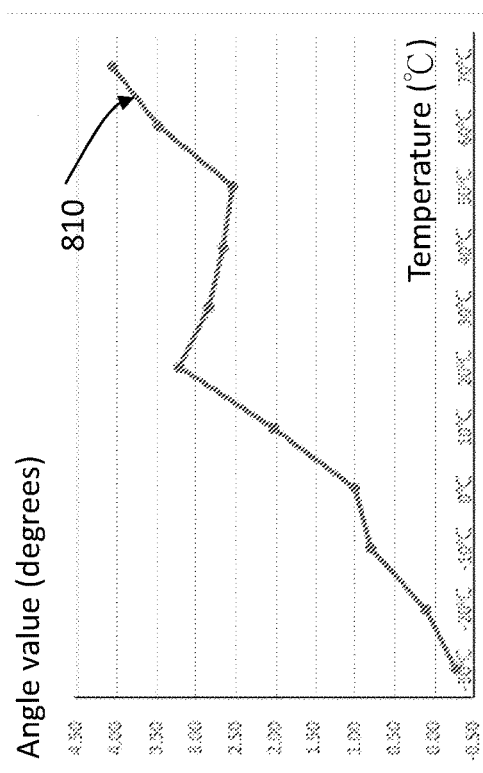
FIG. 8A illustrates a temperature dependence angle values measured by a tilt sensor (sampling by a tilt sensor) that is included in (or integrated with) the smart alarm module according to a preferred embodiment of the present invention.

The aforementioned three types of trigger mode are related to the detecting and activating alarm for a tilt sensor under ideal conditions. However, the current available tilt sensors are MEMS (Micro-Electro-Mechanical Systems) sensors. Typically, these tilt sensors have small size with good sensitivity and accuracy and are operatable in extended temperature range. Despite these advantages, the MEMS tilt sensor, which are made of semiconductor and their output data can be drifted when ambient temperature is changed. FIG. 8A shows output angle values (curve 810) of a MEMS tilt sensor been placed on a fixed platform at 0° and measured in a temperature range from −30° C. to 70° C., which are temperature dependent. It can be seen that the output angle values are drifted and varied in a non-linear way according to the temperature change, especially the change of angle values between +10° C. to +20° C. can exceed over 1°. The temperature dependent characteristic of the output angle values produced by the tilt sensor can cause false alarm, while any of the aforementioned trigger mode is applied.

To overcome the false alarm mentioned in previous paragraph, a new method is proposed to deal with potential false alarm caused by the temperature dependent characteristic of the output angle values, which involves utilizing a modified trigger line behaved like the measured output angle values but with offset angle values to replace the fixed trigger line. In FIG. 8B, the measured angle values (sampling angle values), i.e. curve 810, and the modified trigger line, i.e. curve 820, of the tilt sensor are respectively shown, according to one preferred embodiment of the present invention.

Data processing methods to eliminate false alarms caused by temperature drift of angle values can be drafted as follows. Firstly, output angle values (curve 810) of a MEMS tilt sensor shown in FIG. 8A was taken over a course of 24 hours, but the variation of angle value in terms of fixed time period is insignificant. For example, the temperature changes measured by the tilt sensor per minute is approximately 0.0007°~0.0021° (1°/1440~3°/1440). It can be regarded as almost unchanged. This feature can be used to process the data to solve the problem of false alarms caused by temperature drift characteristic of the measured angle values.

The idea of activating the alarm for the tilt sensor can be summarized as follows, the angle values of the tilt sensor is initially stored in both register A, denoted as A(n), and register B, denoted as B(n) of the tilt sensor, keep updating the angle values stored in register B, denoted as B(n+1), and compared with the angle value stored in register A taken from previous time, i.e., Δt earlier, A(n), where n is the updating time. The updating angle value stored in register B, i.e., B(n+1), is compared with angle value stored in register A taken from previous time, i.e., A(n). If |A(n)−B(n+1)|>1°, alarm is triggered; otherwise, the updated angle value of register B, denoted as B(n+1), is stored in register A (i.e. set A(n+1)=B(n+1)), i.e. keep updating the angle value of register B and store in register A.

Figure 8C:
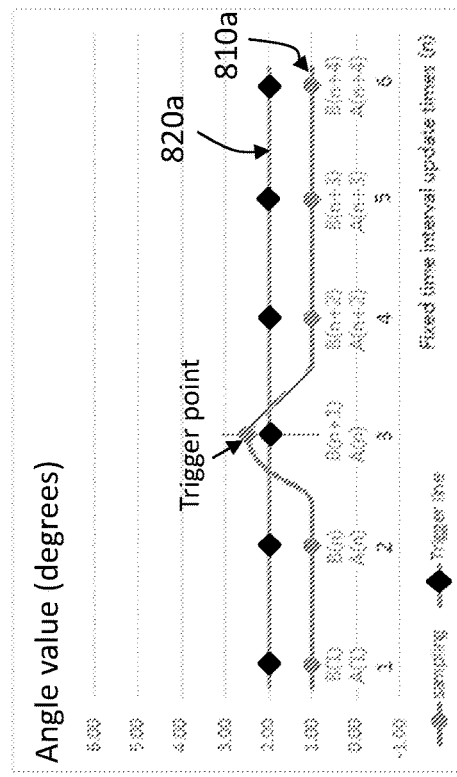
FIG. 8C illustrates both measured angle values (sampling value) and trigger line for a tilt sensor included in (or integrated with) the smart alarm module in a scenario that a vehicle has been jack-up according to a preferred embodiment of the present invention.
Figure 8B:
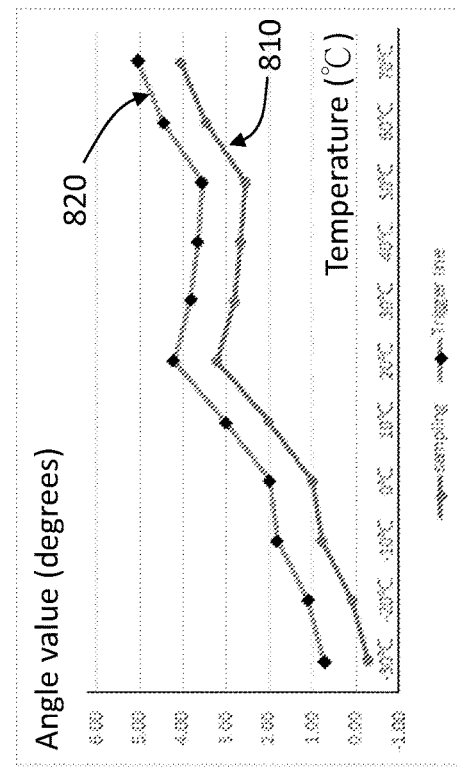
FIG. 8B illustrates both measured angle values (sampling value) and trigger line adapted to compensate temperature dependent angle values for a tilt sensor included in (or integrated with) the smart alarm module according to a preferred embodiment of the present invention.
Figure 9:
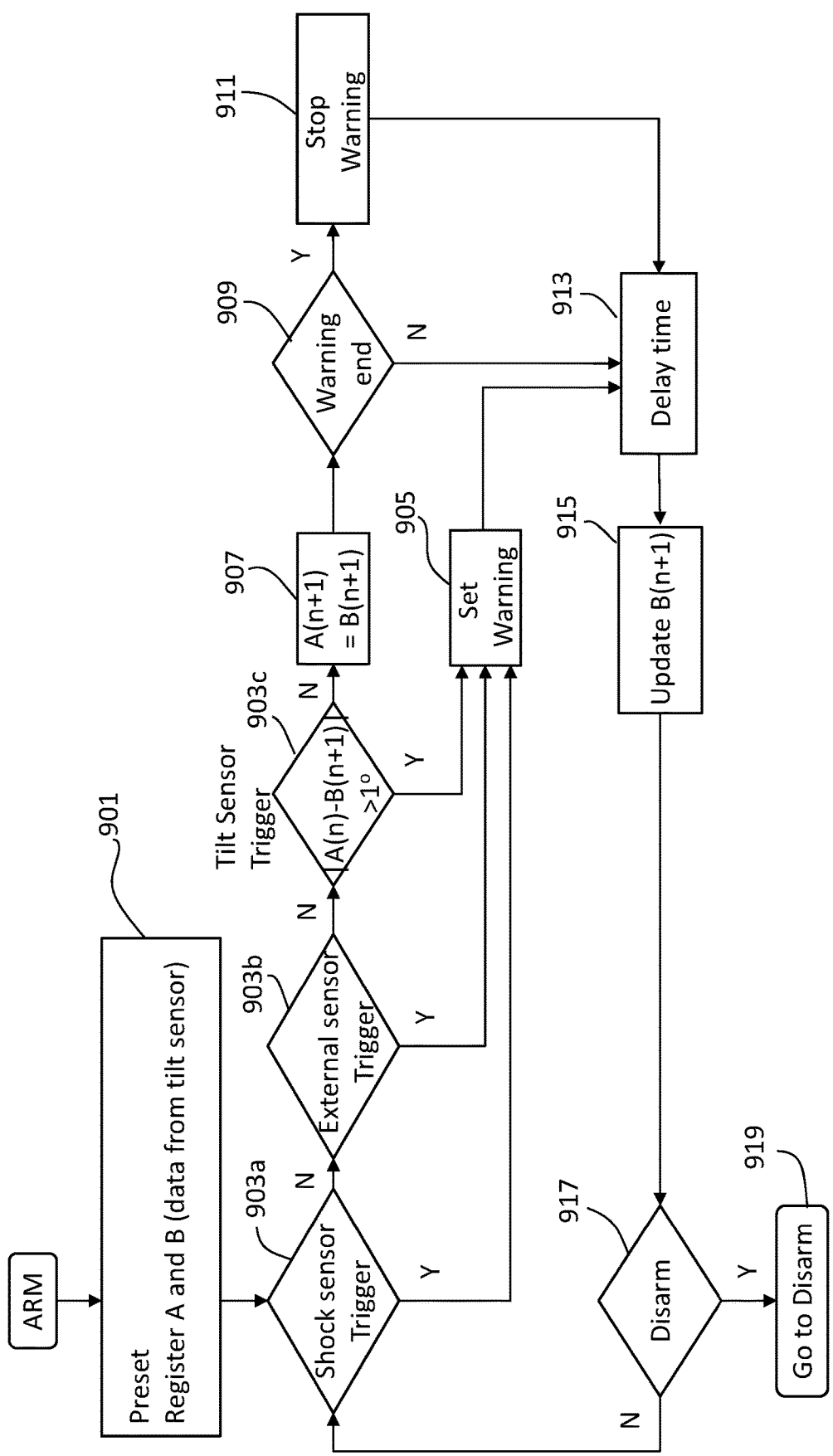
FIG. 9 illustrates the system armed process stored in the microprocessor of the smart sensor module included (or integrated with) the tilt sensor that is used to perform the function as a smart alarm system according to a preferred embodiment of the present invention.

FIG. 8C illustrates the scenario where the measured angle values (sampling angle values), i.e. curve 810a, is greater than the modified trigger line, i.e. curve 820a, at certain moment, and trigger point is indicated. In FIG. 8C, total have 6 sampling angle values been taken, for n=3, |A(n)−B(+1)| is greater than 1°, indicate that the tilt sensor should be triggered to send warning (alarm), i.e., there should have a trigger point exist for n=3. In addition, since there is only 6 sampling point taken, which means that during this period of time the variation of angle values from the tilt sensor, other than the trigger point, is neglectable. It should be noticed that the measured angle values (sampling angle values), i.e. curve 810a, will follow the output angle values (curve 810) of a MEMS tilt sensor shown in FIG. 8B as the sampling time is long enough; similarly, the modified trigger line, i.e. curve 820a, will also follow curve 820 shown in FIG. 8B as the sampling time is long enough;

Continued from the process depicted in FIG. 6, a procedure to operate the system armed function of the smart alarm module included (or integrated with) the tilt sensor can be shown in FIG. 9, which is only one example to demonstrate how certain steps are utilized to complete a couple of actions that perform the features of the smart alarm system according to one preferred embodiment of the present invention. A procedure to operate the system armed function of the smart alarm module is stored in the microprocessor 510, which can be described as follows, it begins from step 901 to preset register A and B to store the initial angle data produced from the tilt sensor, at this moment the initial angle data stored in both register A, i.e., A(n), and register B, i.e., B(n) are the same, where n is the updating time; next check if any of the follow steps, i.e. shock sensor trigger (step 903a), the external trigger (step 903b) or the tilt sensor trigger (step 903c) is activated; if no, meaning that none of these sensors is triggered to set warning (sent out alarm). At this initial stage, A(n) is equal to B(n), then proceeds to step 907 where the angle value of register B, i.e. B(n) is stored in register A to replace the original angle value stored in register A, i.e. A(n); then in step 909, check if the warning is ended, if yes stop warning (step 911) then proceeds to step 913 to delay a predetermine period of time (step 913), otherwise directly go to step 913 to delay a predetermined period of time, then proceeds to update angle value of register B, i.e. B(n) is updating to B(n+1) (step 915), and then check if the smart alarm module is disarmed (step 917), if not go back to step 903a for performing next loop, otherwise disarm the smart alarm module (step 919).

On the other hand, if at least one of the follow steps, i.e. shock sensor trigger (step 903a), the external trigger (step 903b) or the tilt sensor trigger (step 903c) is activated; meaning that at least one of these sensors is triggered, proceeds to step 905 to start alarm for 30 seconds; then directly go to step 913 to delay a predetermined period of time, follow by updating angle value of register B (step 915), then check if the smart alarm module is disarmed, if not go back to step 903a for another loop, otherwise disarm the smart alarm module (step 919).

From the previous two paragraphs, we shall emphasis that the angle values of the tilt sensor are initially stored in both register A, denoted as A(n), and register B, denoted as B(n) of the tilt sensor, keep updating the angle values stored in register B, denoted as B(n+1), and compared with the angle value stored in register A taken from previous time, i.e., Δt earlier, A(n), where n is the updating time. The updating angle value stored in register B, i.e., B(n+1), is compared with angle value stored in register A taken from previous time, i.e., A(n). If |A(n)−B(n+1)|>1°, alarm is triggered; otherwise, the updated angle value of register B, denoted as B(n+1) is stored in register A (i.e. set A(n+1)=B(n+1)), i.e. keep updating the angle value of register B and store in register A.

In summary, the procedure shown in FIG. 9 only taken a tilt sensor used to detect changes in the angle values of X axis as an example, similar procedure can also be realized for Y Y axis or Z axis.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A smart alarm module equipped for a vehicle comprising:
    a microcontroller adapted to arm said smart alarm module in response to a remote controller;
    a tilt sensor coupled to said microcontroller, wherein said tilt sensor is applied to said vehicle to sense change of angle values of said vehicle; wherein said tilt sensor is activated to trigger an alarm when said change of angle values exceeds a predetermined value;
    wherein said tilt sensor includes a register A and a register B to respectively store initial angle values produced from said tilt sensor; wherein said tilt sensor keep updating said angle values stored in said register B, a current updated angle value stored in said register B, denoted as B(n+1), and said current updated angle value comparing with said angle value stored in said register A taken from previous time, denoted as A(n), where n is a updating time, wherein a calculation of |A(n)−B(n+1)| is performed to check whether said tilt sensor is triggered, if |A(n)−B(n+1)| is greater than said predetermine value, sends out said alarm; otherwise, stores said updated angle data of said register B in said register A, namely, setting A(n+1)=B(n+1)), and keep updating said angle value of said register B and store in said register A at a constant time period.

2. The smart alarm module of claim 1, further comprising a shock sensor, an ultrasonic sensor, a microwave sensor or the combination thereof.

3. The smart alarm module of claim 2, wherein said smart alarm module is activated to send out said alarm when one of said shock sensor, said ultrasonic sensor, said microwave sensor or said tilt sensor is triggered.

4. The smart alarm module of claim 2, wherein said shock sensor includes a piezo shock sensor, a magnetic shock sensor or the combinations thereof.

5. The smart alarm module of claim 1, wherein said alarm is output by a car horn, a siren, a buzzer, or the combinations thereof.

6. The smart alarm module of claim 1 further comprising an arm mode and a disarm mode respectively settable in response to a lock button or an unlock button of said remote controller.

7. The smart alarm module of claim 6, wherein said microprocessor is adapted to arm or disarm said smart sensor module in response to said lock button.

8. The smart alarm module of claim 7, wherein an exterior lighting device is responsive to said arm or disarm.

9. A smart alarm module equipped for a vehicle comprising:
    a CAN bus interface adapted to make connection to CAN bus of said vehicle to detect communication protocol and receive information from a remote controller;
    a microcontroller adapted to arm said smart alarm module in response to a remote controller;
    a tilt sensor coupled to said microcontroller, wherein said tilt sensor is applied to said vehicle to sense change of angle values of said vehicle; wherein said tilt sensor is activated to trigger an alarm when a quantized values or said change of angle values exceeds a predetermined value; wherein said tilt sensor includes a register A and a register B to respectively store initial angle values produced from said tilt sensor;
    wherein said tilt sensor keep updating said angle values stored in said register B, a current updated angle value stored in said register B, denoted as B(n+1), and said current updated angle value comparing with said angle value stored in said register A taken from previous time, denoted as A(n), where n is a updating time, wherein a calculation of |A(n)−B(n+1)| is performed to check whether said tilt sensor is triggered, if |A(n)−B(n+1)| is greater than said predetermine value, sends out said alarm;
    otherwise, stores said updated angle data of said register B in said register A, namely, setting A(n+1)=B(n+1)), and keep updating said angle value of said register B and store in said register A at a constant time period.

10. The smart alarm module of claim 9, further comprising a shock sensor, an ultrasonic sensor, a microwave sensor or the combination thereof.

11. The smart alarm module of claim 10, wherein said smart alarm module is activated to send out said alarm when one of said shock sensor, said ultrasonic sensor, said microwave sensor or said tilt sensor is triggered.

12. The smart alarm module of claim 10, wherein said shock sensor includes a piezo shock sensor, a magnetic shock sensor or the combination thereof.

13. The smart alarm module of claim 9, wherein said alarm is output by a car horn, a siren, a buzzer, or the combinations thereof.

14. The smart alarm module of claim 9 further comprising an arm mode and a disarm mode respectively settable in response to a lock button or an unlock button of said remote controller.

15. The smart alarm module of claim 14, wherein said microprocessor is adapted to arm or disarm said smart sensor module in response to said lock button.

16. The smart alarm module of claim 15, wherein an exterior lighting device is responsive to said arm or disarm.

* * * * *